(12) United States Patent
Gaither

(10) Patent No.: US 6,434,672 B1
(45) Date of Patent: Aug. 13, 2002

(54) METHODS AND APPARATUS FOR IMPROVING SYSTEM PERFORMANCE WITH A SHARED CACHE MEMORY

(75) Inventor: Blaine D. Gaither, Ft. Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/515,727

(22) Filed: Feb. 29, 2000

(51) Int. Cl.[7] .............................................. G06F 12/12
(52) U.S. Cl. ..................... 711/130; 711/122; 711/147; 711/154
(58) Field of Search ................. 711/122, 130, 711/147, 154

(56) References Cited

U.S. PATENT DOCUMENTS

| | | | | |
|---|---|---|---|---|
| 5,623,628 A | * | 4/1997 | Brayton et al. | 711/141 |
| 5,860,095 A | | 1/1999 | Iacobovici et al. | 711/119 |
| 5,963,973 A | * | 10/1999 | Vanhove et al. | 711/130 |
| 6,055,605 A | * | 4/2000 | Sharma et al. | 711/130 |
| 6,223,256 B1 | * | 4/2001 | Gaither | 711/134 |
| 6,253,290 B1 | * | 6/2001 | Nakamoto | 711/138 |

OTHER PUBLICATIONS

Intel, Memory Cache Control, Chapter 11, pp. 1–28.

* cited by examiner

Primary Examiner—Reba I. Elmore

(57) ABSTRACT

A computer system comprising a plurality of processors each having dedicated cache memories, another level of cache shared by the plurality of caches, and a main memory. The processors and the shared cache act as peers on a bus located between the processors and main memory. All data placed upon the bus by the main memory as a result of a read transaction are written into the shared cache. The shared cache does not initiate any transactions.

16 Claims, 4 Drawing Sheets

METHODS AND APPARATUS FOR IMPROVING SYSTEM PERFORMANCE WITH A SHARED CACHE MEMORY

FIELD

The present invention relates to computer systems, and more particularly, but not by way of limitation, to methods and apparatus for improving computer system performance with a shared cache memory.

BACKGROUND

A cache memory is a high-speed memory unit interposed in the memory hierarchy of a computer system between the relatively slower main memory and the relatively faster processors to improve effective memory transfer rates thereby improving system performance. The name refers to the fact that the small cache memory unit is essentially hidden and appears transparent to the user, who is aware only of the larger main memory. The cache memory is usually implemented by semiconductor memory devices having speeds that are comparable to the speed of the processor, while the main memory utilizes a less costly, lower-speed technology. The cache memory concept anticipates the likely reuse by a processor of selected data in main memory by storing a copy of the selected data in the cache memory where it may be accessed by a processor request for it significantly quicker.

A cache memory typically includes a plurality of memory sections, wherein each memory section stores a block or a "line" of two or more words of data. For systems based on the particularly popular model 80486 microprocessor, a line consists of four "doublewords" (wherein each doubleword comprises four 8-bit bytes). Each line has associated with it an address tag that uniquely identifies which line of main memory it is a copy of.

In many computer systems, there may be several levels of cache memory. For example, each processor of a computer system may have one or more internal cache memories dedicated to that processor (these cache memories may be referred to as local cache memories). These dedicated cache memories may operate in a heirarchical fashion—i.e., first, the lowest level of cache memory is interrogated to determine whether it has the requested line of main memory and, if it is not there, the second lowest level of cache memory is then interrogated, and so forth. One or more processors, in turn, may share level of cache memory, and it is conceivable that one or more shared cache memories may themselves share another level of cache memory. At the highest level of memory is the main memory, which is inclusive of all of the layers of cache memory. (Note that main memory may also be referred to as system memory).

By way of illustration, consider the operation of a simple system having one processor, one level of cache memory, and main memory. When a read request originates in the processor for a line of data, an address tag comparison is made to determine whether a copy of the requested word resides in a line of the cache memory. If present, the data is used directly from the cache memory. This event is referred to as a cache read "hit." If the data is not present, a line containing the requested word is retrieved from main memory and stored in the cache memory. The requested word is simultaneously provided to the processor. This event is referred to as a cache read "miss."

In addition to using a cache memory to retrieve data, the processor may also write data directly to the cache memory instead of to the main memory. When the processor desires to write data to memory, an address tag comparison is made to determine whether the line into which data is to be written resides in the cache memory. If the line is present in the cache memory, the data is written directly into the line. This event is referred to as a cache write "hit." In many systems a data "dirty bit" for the line is then set. The dirty bit indicates that data stored within the cache memory line is dirty or modified and is, therefore, the most up-to-date copy of the data. Thus, before the line is deleted from the cache memory or overwritten, the modified data must be written into main memory. This latter principle may be referred to as preserving cache coherency.

If the line into which data is to be written does not exist in the cache memory, the line is either fetched into the cache memory from main memory to allow the data to be written into the cache memory, or the data is written directly into the main memory. This event is referred to as a cache write "miss."

In some cases, a cache memory may need to "castout" a line of data because of the limited amount of storage space inherent in cache memories. This castout data may be dirty or modified in which case it should not be discarded by the computer system. Thus, castout data is normally provided to the next higher level of cache memory (which may actually be the main memory) usually during a special set of bus cycles. This too preserves cache coherency.

Cache memories may operate under a variety of protocols, including the popular MESI (Modified, Exclusive, Shared, Invalid) protocol where data in a particular cache may be marked as dirty or modified, exclusive to the particular cache memory and main memory, shared between two or more cache memories, or an invalid line in the cache memory (which will result in a cache miss). More information regarding caching principles and techniques, including the MESI protocol, may be found in the various versions and volumes of the *Intel P6 Family of Processors, Hardware Developer's Manual* all of which are hereby incorporated by reference.

Turning now to FIG. 1, there is shown a computer system 10 operating according to these conventional caching principles and techniques. In computer system 10, processors 20A–D each have a dedicated cache memories 30A–D, respectively. Additionally, processors 20A–B are operably connected to and share a shared cache memory 50A through bus 40A, while processors 20C–D are operably connected to and share a shared cache memory 50B through bus 40B. Processors 20A–B are symmetric agents on bus 40A and shared cache memory 50A is a priority agent on bus 40A. Processors 20C–D and shared cache memory 50B operate in a similar fashion on bus 40B. The shared cache memories 50A and 50B, in turn, act as symmetric agents on bus 60 and a memory subsystem 70 (comprising a memory controller 80 and main memory 90) acts as a priority agent.

In operation, processor 20A may, for example, issue a read or write request for a line of data located in main memory. Processor 20A will first determine whether its dedicated cache memory 30A contains the requested line. If so, the line is provided to the processor 20A from its dedicated cache memory 30A. If, however, the line of data requested is not present in dedicated cache memory 30A, a "snoop" phase is initiated on bus 40A to determine if the requested line is located in dedicated cache memory 30B (belonging to processor 20B) or in shared cache memory 50A. During a snoop phase, other cache memories on bus 40A, may issue signals if they have a copy of the requested line (e.g., by raising a HIT# signal) and what the condition of the line is (e.g., whether the line is dirty or modified, exclusive to that cache memory and main memory, or shared by that cache memory and one or more cache memories). If the line is located in a cache memory located on the bus 40A, the line will be provided to dedicated cache 30A where it may be cached. However, if the requested line is not located in any of the cache memories located on bus 40B (including the shared cache memory 50A), the shared cache memory 50A must then initiate the read or write transaction on bus 60 (in effect "re-initiating" the original transaction) to access the requested line from main memory 90. (In some cases of course, the shared cache memory 50A will need to initiate a snoop phase on bus 60 to determine whether the requested line is in shared cache memory 50B or some other cache memory on bus 60). Main memory 90 will then respond to the line request and place the requested line of data on bus 60. After several bus cycles, the requested line of data eventually makes its way to the dedicated cache memory 30A of the requesting processor 20A, where it is cached according to system protocol.

At least one drawback of the system 10 of FIG. 1 is the delays associated with accessing a requested line from main memory 90 in the manner described above. In addition to any delays inherent in the internal design of shared cache memory 50A, the transaction initiated on bus 60 requires another bus arbitration cycle, etc. Similarly, the return path from main memory 90 to the cache memory 30A of the requesting processor 20A requires more bus arbitrations and other delays. Thus, there exists a need in the art for cache memory systems having a reduced delay in servicing dedicated cache memory misses. There also exists an need in the art for cache memory systems having lower memory request latencies and that cause relatively less bus traffic.

SUMMARY

A computer system comprising a plurality of processors each having dedicated cache memories, another level of cache memory shared by the plurality of cache memories, and a main memory. The processors and the shared cache memory act as peers on a bus located between the processors and main memory. All data placed upon the bus by the main memory as a result of a read transaction are written into the shared cache memory. The shared cache memory does not initiate any transactions.

DETAILED DESCRIPTION

A. Description of an Embodiment

Figure 1:
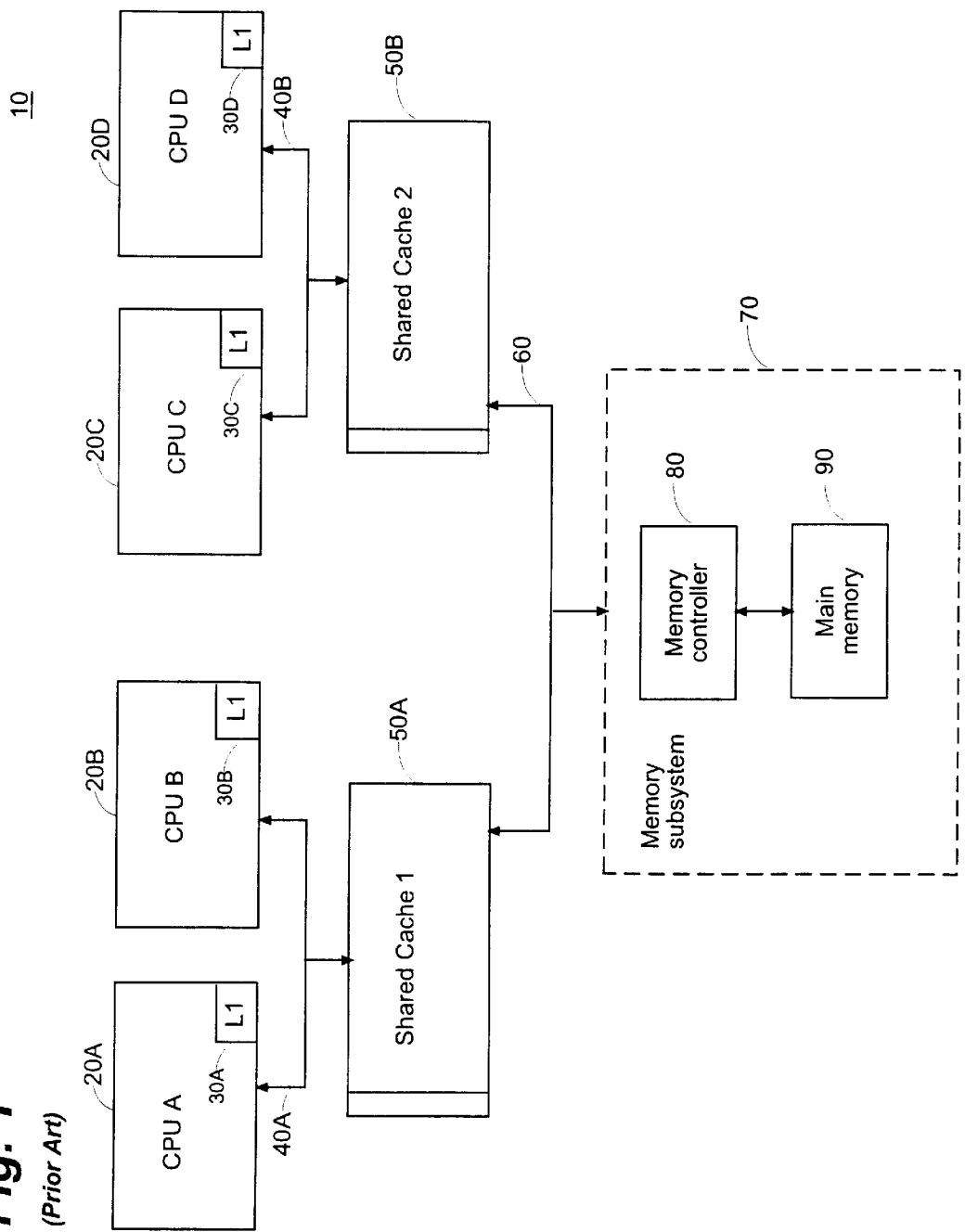
FIG. 1 is a block diagram of prior art computer systems.
Figure 2:
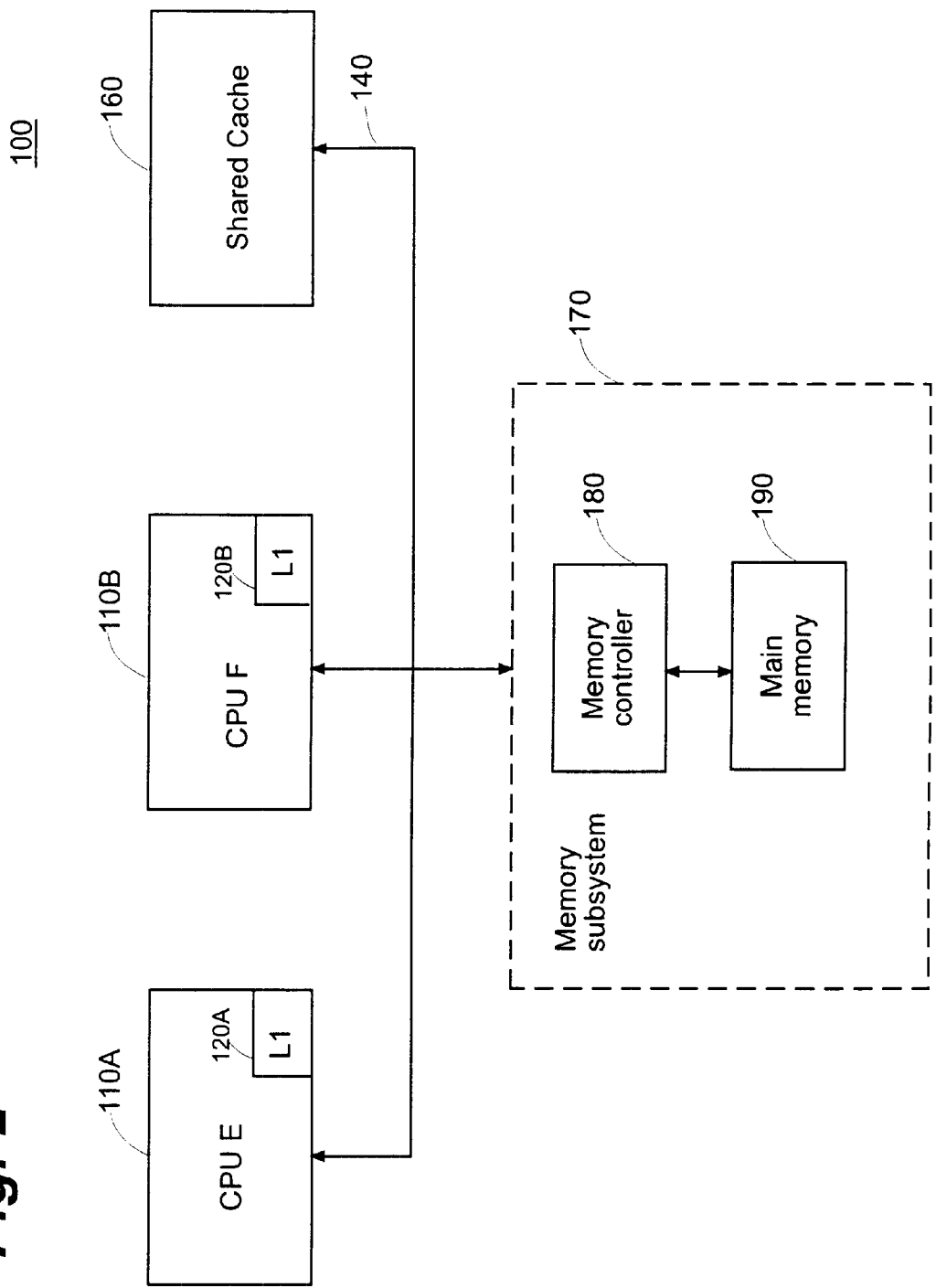
FIG. 2 is a block diagram of one embodiment of the present invention.

In FIG. 2, there is shown an example of a computer system 100 according to the present invention. The computer system 100 may comprise a pair of processors 110A and 110B, with each processor 110A and 110B having its own dedicated cache memories 120A and 120B, respectively. These dedicated cache memories 120A and 120B may be external or internal to their respective processors 110A and 110B. Additional processors and associated levels of dedicated cache memory may also be used.

The computer system 100 may also comprise a memory subsystem 170 having a memory controller 180 and main memory 190. The computer system 100 may also comprise shared cache memory 160. The processors 110A and 110B, memory subsystem 170, and shared cache memory 160 may be interconnected via bus 140 to which they are all logically connected—i.e., they are all operating according to the particular protocol of bus 140. The processors 110A and 110B and shared cache memory 160 act as symmetric agents (i.e., "peers") on bus 140 while the memory subsystem 170 acts as a priority agent. The processors 110A and 110B and the shared cache 160 operate in parallel on bus 140.

B. Method of Operation

As illustrated in the description below, the present invention may operate according to the following principles: (1) dirty or modified lines are never written into the shared cache memory 160, (2) to prevent various protocol violations (or the chances of them) only one copy of dirty or modified data may exist in the system 100 at any one time, and (3) all read request lines placed on the bus 140 by main memory 190 are written into or "snarfed" by the shared cache memory 160.

Figure 3A:
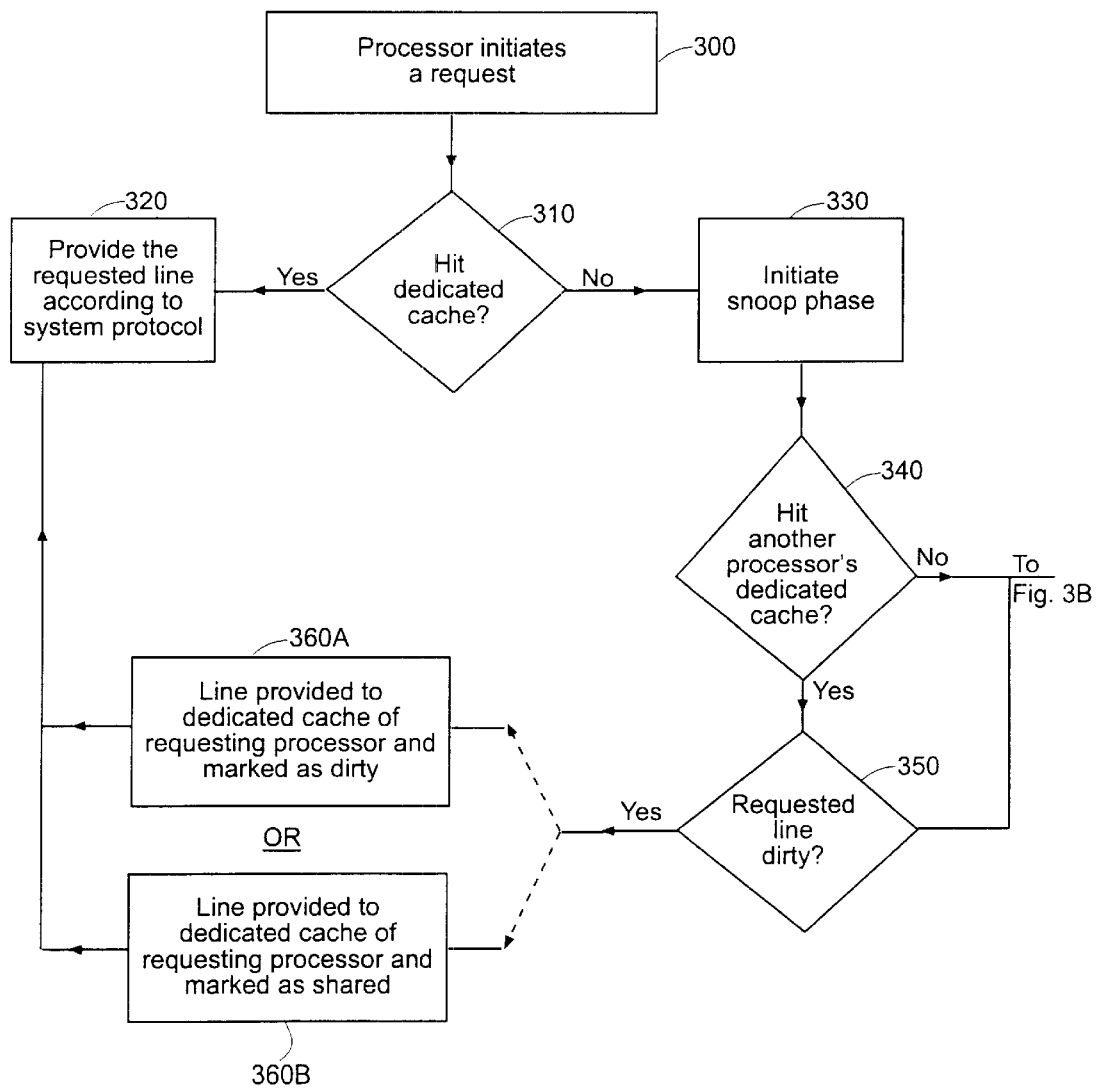
FIGS. 3A–B are flow charts illustrating the operation of one embodiment of the present invention.
Figure 3B:
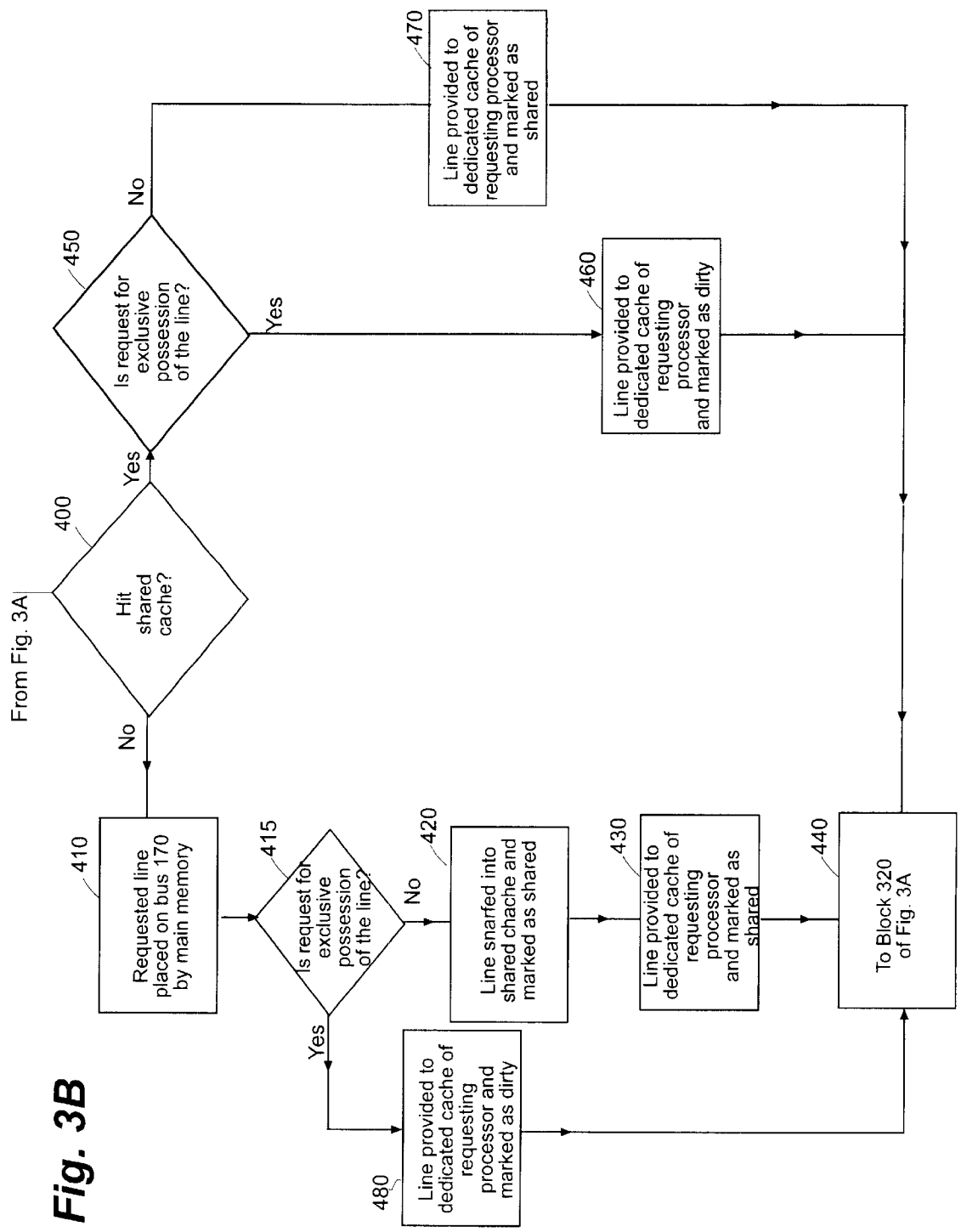

Turning now to FIGS. 3A–B, the operation of system 100 with respect to a transaction issued by processor 110A is illustrated. (Processor 110A or any other system component requesting a line of data may be referred to as a bus agent). At block 300 of FIG. 3A, processor 110A has initiated a request indicating that the processor 110A would like to possess a certain line of main memory 190. At block 310, it is determined whether the line that processor 110A has requested is located in the processor's dedicated cache memory 120A. If so, operation proceeds to block 320, where the data stored in the requested line is provided to processor 110A.

However, if the requested line is not located in the processor's dedicated cache memory 120A, a snoop phase is initiated on bus 140 at block 330 to determine whether copies of the line are located in the dedicated cache memories of other processors on bus 140 (e.g., dedicated cache memory 120B) or in the shared cache memory 160. Thus, at block 340 and during the snoop phase, it is determined whether a copy of the line is located in processor 110B's dedicated cache memory 120B. If so, operation proceeds to block 350, where it is determined if the line is dirty (e.g., marked as Modified in a MESI system). If the line is dirty (indicating that it is the most up-to-date copy of the line and the only up-to-date copy that exists in system 100), the line is provided or fetched into dedicated cache memory 120A at block 360A and marked as dirty. In that case, the line would then be invalidated in dedicated cache memory 120B, thus ensuring that one and only one copy of the modified data exists in the system 100. Alternatively, at block 360B, the requested line is provided to the dedicated cache memory 120A and marked as shared, thus making it possible for cache memory 120B to keep a copy of the line (which will also be marked as shared). Once the requested line is located in dedicated cache memory 120A (marked as either dirty or shared), operation may proceed as in block 320. If operation of system 100 proceeds as in the embodiment of block 360B, the shared cache 160 may "snarf" the line, meaning that the line may be written into shared cache 160. This ensures that the shared cache memory 160 will be provided with a copy of the requested data.

Returning now to blocks 340 and 350, if the requested line is not in the processor 110B's dedicated cache memory 120B (i.e., block 340) or if it is in dedicated cache memory 120B but not marked as dirty (i.e., block 350—meaning that it is shared with another level of memory), operation proceeds to block 400 of FIG. 3B. At block 400 it is determined whether the requested line is located in the shared cache memory 160. If so, at block 450, it is determined whether the request is for exclusive possession of the line. If so, at block 460, the requested line is provided to the dedicated cache memory 120A of processor 110A and marked as dirty. The copy of the line in shared cache memory 160 is invalidated, thus ensuring that one and only one copy of the modified data exists in the system 100. At block 450, if the request is not for exclusive possession of the line, it is provided to the dedicated cache 120A of processor 120B and marked as shared in both the dedicated cache 120A and shared cache 160. Operation may then proceed as in block 320.

If, however, at block 400, the snoop phase does not indicate that the shared cache memory 160 contains the requested line, it is known that the most up-to-date copy of the requested line must be located in main memory 190 (where it may be marked as shared with dedicated cache memory 120B—see block 350). At block 410, the requested line is placed on the bus 140 by main memory 190. (In another embodiment, the requested line may, of course, be placed on the bus 140 by the dedicated cache memory 120B). At block 415, it is determined whether the request is for exclusive possession of the line. If so, at block 480, the line is provided to the dedicated cache memory 120A of processor 110A and marked as dirty. Operation then proceeds as in block 320 of FIG. 3A. If the request is not for exclusive possession, at block 420, the line is written into or "snarfed" by shared cache memory 160. The shared cache memory 160 also signals that it has a copy of the line (e.g., by raising HIT#) thereby indicating that the shared cache memory 160 intends to keep a copy of the line. The line is also written into the processor 110A's dedicated cache memory 120A at block 430 and operation then proceeds as in block 320 of FIG. 3A.

C. Remarks

Thus by making the shared cache memory 160 a "peer" on bus 140 with the processor dedicated caches 120A and 120B, delays in servicing cache misses may be reduced—the shared cache memory 160 need no longer arbitrate for the bus 140 on which main memory 190 is located, in fact, the shared cache memory 160 does not initiate transactions at all. The shared cache memory essentially monitors the bus 140 for traffic and snarfs data as needed. The shared cache 160 signals its intention to keep a copy of the snarfed line or signals that the line should be marked as modified to maintain system protocol.

It will be readily apparent to those skilled in the art that innumerable variations, modifications, applications, and extensions of these embodiments and principles can be made without departing from the principles and spirit of the invention. For example:

In one embodiment, castout lines may be handled in much the same way as requested lines are when requested lines are placed on bus 140 by memory 190. Castout lines may be written into shared cache memory 160 so that if the castout lines are requested by a processor during the next set of bus cycles, they will be available in the shared cache memory 160.

In another embodiment, when shared cache 160 provides a requested line to a requesting processor, it may signal to the requesting processor that the line of data is dirty, even though dirty lines are never written into the shared cache. This process may be referred to as "dirty spoofing" and may be utilized to allow the Intel architecture implicit writeback protocol to return the requested data to the requesting agent. Details of the implicit writeback protocol may be found in the various versions and volumes of the *Intel P6 Family of Processors, Hardware Developer's Manual* all of which, again, are incorporated by reference.

In another embodiment, the shared cache memory 160 of FIG. 2 may be packaged such that it may occupy a standard processor connection slot. In this manner, the cache memory 160 may be used in various systems and platforms that contemplate the addition of a processor, thereby allowing for relatively easy addition of the shared cache memory 160 to such a system.

Moreover, the detailed description above described certain aspects of the present invention in terms of the IA-32 architecture, however, the invention is not so limited and one skilled in the art will note that the invention has applicability in other architectures as well. Accordingly, it is intended that the scope of the invention be only limited as necessitated by the accompanying claims.

What is claimed is:

1. A system comprising:

at least two processors:

at least two first level cache memories logically connected to a bus;

a shared cache memory external to the at least two first level cache memories and the at least two processors logically connected to the bus in parallel with the first level caches, such that the shared cache memory is a peer on the bus to the at least two first level cache memories; and a main memory external to the shared cache memory logically connected to the bus in parallel with the shared cache memory;

wherein the shared cache monitors the bus for data, and performs one of the following signals that the line should be stored as modified.

2. The system of claim 1, further comprising:

at least two processors;

wherein the at least two first level cache memories are cache memories dedicated to a respective processor.

3. In a system having at least one bus agent for initiating a request for a line of data from the system's memory, wherein the bus agent has an associated cache memory, a method for accessing the system's memory, comprising:

initiating a request on a bus for a line of data;

determining whether the line of data is stored in a fist level of cache memories logically connected to the bus, and if it is not;

determining whether the line of data is stored in a shared cache logically connected to the bus in parallel with the first level of cache memories, and if not;

accessing the line of data from the system's main memory and placing the line of data on the bus;

if the request is not for exclusive possession of the line, writing the line of data into the shared cache and marking it as shared; and writing the line of data into a requesting processor's dedicated cache memory and marking it as shared.

4. The method of claim 3, further comprising:

if the line of data is not stored in the shared cache and the request is not for exclusive possession of the line of data, providing the line of data to the cache associated with the requesting agent and marking it as shared.

5. The method of claim 3, further comprising:

if the line of data is not in the shared cache and the request is for exclusive possession of the line of data, providing the line of data to the cache associated with the requesting agent and marking it as dirty.

6. The method of claim 3, further comprising:

if the line of data is in the shared cache, providing the line of data to the cache memory associated with the bus agent that initiated the request for the line of data and marking the line of data as shared in both the shared cache and the cache memory associated with the bus agent, unless the request was for exclusive possession of the line of data, in which case invalidating the line of data in the shared cache.

7. The method of claim 3, further comprising:

if the requested line of data is stored in the first level of cache and marked as dirty, providing the line of data to the cache associated with the requesting agent and invalidating the line of data in the first level of cache.

8. The method of claim 3, further comprising:

if the requested line of data is stored in the first level of cache and marked as dirty, providing the line of data to the cache associated with the requesting agent and marking the line of data as shared in both the first level of cache and the cache associated with the requesting agent.

9. The method of claim 3, further comprising:

if the requested line of data is stored in the first level of cache and not marked as dirty, and if the line of data is not in the shared cache and the request is not for exclusive possession of the line, writing the line of data into the shared cache and marking it as shared.

10. The method of claim 3, further comprising:

if the requested line of data is stored in the first level of cache and not marked as dirty, and if the line of data is not in the shared cache and the request is for exclusive possession of the line;

providing the line of data to the cache associated with the requesting agent and marking it as dirty; and invalidating the line in the shared cache.

11. The method of claim 3, further comprising:

if the line of data is in the shared cache, signaling to the requesting agent that the line of data is dirty and providing the line of data to the requesting agent.

12. The system of claim 2, wherein the at least two processors and the shared cache act as symmetric agents on the bus and the main memory acts as a priority agent.

13. The system of claim 1, wherein data placed upon the bus by the main memory as a result of a read transaction is written into the shared cache memory, if the read transaction data is not for exclusive possession.

14. The system of claim 1, wherein the main memory is a part of a memory subsystem including a memory controller.

15. The system of claim 1, wherein the system is configured to avoid writing of dirty or modified lines of data into the shared cache memory.

16. The system of claim 1, wherein the system is configured to include only one copy of dirty or modified data exists in the system at any one time.

* * * * *